United States Patent [19]
Enfield

[11] 3,819,456

[45] June 25, 1974

[54] INSULATION BOARD FABRICATED FROM REFUSE

[76] Inventor: Norman W. Enfield, Rt. Box 84, Fountain, Colo. 80817

[22] Filed: Dec. 26, 1972

[21] Appl. No.: 318,638

Related U.S. Application Data

[63] Continuation of Ser. No. 46,652, June 16, 1970, abandoned.

[52] U.S. Cl. ............................ 161/7, 162/4, 210/10
[51] Int. Cl. ............................................... B32g 1/10
[58] Field of Search ............. 161/7, 168; 162/4, 99, 162/147; 210/10; 195/31

[56] References Cited
UNITED STATES PATENTS

| | | | |
|---|---|---|---|
| 42,155 | 4/1864 | Bardoux | 162/99 |
| 881,098 | 3/1908 | Diskin | 162/99 |
| 1,501,895 | 7/1924 | Andrews et al. | 252/8.1 |
| 2,236,900 | 4/1941 | Greider et al. | 162/4 |
| 2,258,741 | 10/1941 | Champion et al. | 195/31 R |
| 3,163,549 | 12/1964 | Vollink et al. | 195/31 R |
| 3,549,092 | 12/1970 | Baxter, Sr. | 162/4 |
| 3,561,598 | 2/1971 | Goldberg | 162/DIG. 9 |
| R19,528 | 4/1935 | Rafton | 162/147 |

*Primary Examiner*—William E. Schulz
*Attorney, Agent, or Firm*—Cantor and Kraft

[57] ABSTRACT

A structural insulation board fabricated of treated refuse, and the method of preparing the same, are disclosed. The method includes the steps of shredding or grinding trash and garbage, mixing the same with a slurry of a binder, molding the resulting mixture into sheets of any desired thickness, and drying the sheets.

5 Claims, 2 Drawing Figures

PATENTED JUN 25 1974
3,819,456

INVENTOR.
NORMAN W. ENFIELD

BY Jacobi, Davidson, Filling & Siegel

ATTORNEYS

INSULATION BOARD FABRICATED FROM REFUSE

This is a continuation of application Ser. No. 46,652, filed June 16, 1970, now abandoned.

BACKGROUND OF THE INVENTION

This invention relates to waste disposal, and more particularly this invention relates to construction materials fabricated of refuse.

The problem of waste disposal has always been a serious problem especially in urban areas. This problem, at the present time, has reached enormous proportions in terms of pollution of the natural environment. The primary methods of waste disposal generally fall into three categories, namely incineration, burial and discharge, either before or after pre-treatment, into rivers and oceans.

The first method, incineration, is a notorious source of air pollution. This air pollution has become so serious that some municipalities have instituted rigid controls over the same. Furthermore, the residue of the incineration must be disposed of in some other way. This residue is either used as a "sanitary landfill" or is dumped into the ocean. Burial of refuse is extensively practiced by some municipalities but also has its drawbacks. First of all, the refuse is rarely sanitary and only contributes to pollution. This burial is accomplished by using the refuse as so-called "sanitary landfill" either in construction projects or in city dumps. Secondly, the ecological balance is completely unbalanced in areas where burial is extensively practiced since wooded areas and other vegetation are destroyed. The third method that of discharge of the waste into natural waterways, has resulted in what is perhaps the most notorious desecration of our environment—water which is so polluted that it is unfit for drinking or bathing. In many instances raw sewage is discharged into natural waterways. In other instances, the waste is pre-treated before discharging the same into a waterway. Unfortunately, all too often the effluent from the treating plant raises the temperature of the waterway to such a degree that the ecological balance is ruined. Furthermore, the effluent very often provides a rich source of nourishment for certain undesirable organisms which, thereby, thrive where they are not wanted.

Various methods have been proposed for disposing of waste, such methods generally taking two forms. The first is compaction of the refuse to an extremely dense mass followed by disposal in one of the conventional ways. The only advantage this method can offer is that it enables humanity to put more garbage in any unit of volume than ever before. The other method is to treat organic waste in such a manner as to render it sterile without removing any nutritional value it might have. The treated refuse is then used as an animal feed or, in some instances, as a fertilizer. These latter methods are certainly a step in the right direction due to the fact that the waste is put to some good use. Unfortunately, however, there is too much waste and too little need for such animal feed and fertilizers.

There have been proposals for utilizing waste metals and the like to produce various types of structural units. These proposals, as far as they went, were useful but they still left much to be desired in waste disposal. The primary difficulty associated with these proposals is one of determining how to dispose of the trash which is unsuitable for inclusion therein. Unfortunately the answer to that question is always to use a conventional waste disposal method.

Accordingly, a need exists for an efficient, inexpensive method of waste disposal which does not pollute the environment.

SUMMARY OF THE INVENTION

It is, therefore, an object of the present invention to provide a waste disposal method free of the aforementioned and other such disadvantages.

It is another primary object of the present invention to provide a method of waste disposal which utilizes the refuse in a useful manner.

It is yet another object of the present invention to provide a method of waste disposal which is free of environmental pollution.

It is still another object of the present invention to provide a building material fabricated of refuse.

Other objects will become apparent as the description of the invention proceeds.

Generally, in accordance with the present invention, the refuse is shredded or comminuted as a first step. The shredded waste material, in one embodiment, is then mixed with a binder and molded to any desired size and shape. In another embodiment, the shredded material is fireproofed and used as-is.

BRIEF DESCRIPTION OF THE DRAWING

The invention will be understood from the following detailed description and from the annexed drawings wherein.

DESCRIPTION OF THE PREFERRED EMBODIMENTS

Figure 1:
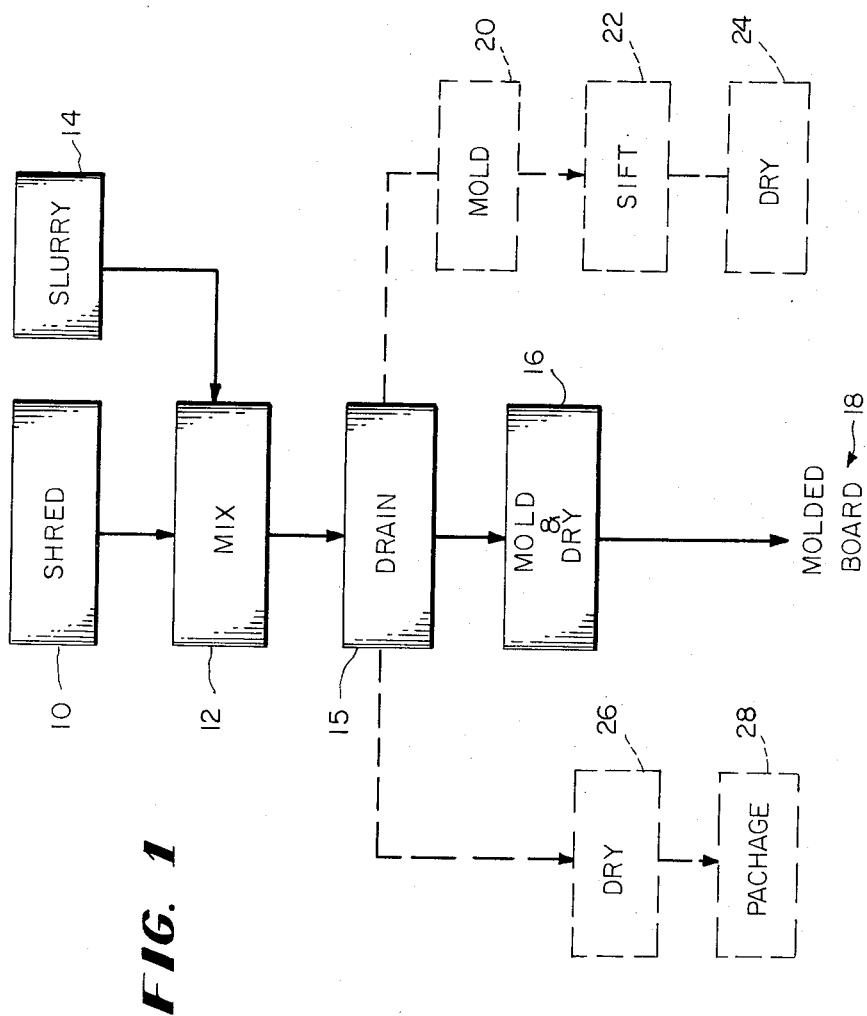
FIG. 1, is a diagramatic flow chart of the method of the instant invention.

Referring now to the drawings, and more particularly to FIG. 1, the regular run of trash and garbage is fed into a conventional shredder or grinder 10 and comminuted to a particle size approximately equivalent to that of excelsior which is commonly used as a packing material. The refuse fed into the shredder or grinder 10 can comprise either organic or inorganic materials or a combination. Only the very largest or heaviest metal objects need be removed prior to the grinding operation merely to avoid damage to the equipment. It is, of course, preferable to sanitize the trash and garbage using any known method. From the shredder or grinder 10 the comminuted refuse then goes to a mixer 12 where is is mixed with slurry of a suitable binder which was made up in a mixing tank 14.

The binder can be any suitable material such as aluminum sulfate, sodium silicate or magnesium oxide. It should be understood that while these materials are mentioned as exemplary materials, any compound or mixture which is a known binding agent can be used. The binder is mixed in a water slurry in mixing tank 14 and then passed to mixer 12 wherein it is thoroughly mixed with the shredded refuse.

The resulting slurry of ground refuse and binder is then drained by conventional means such as a filter 15 and then charged to a mold or press 16 where it is molded to any desired shape or thickness and dried. It is then discharged from the mold as a wall board or any other desired structural construction material 18.

In another embodiment, the binder is a mixture of starch and an enzyme. After the binder is thoroughly mixed with the shredded refuse as a slurry in the mixture 12 and surplus liquid is drained off at 15, the slurry is then charged to a mold 20. The molded material is discharged from the mold and the surface thereof is sifted with cement as at 22. The material is then dried as at 24 and then prepared for storage or shipping. It should be distinctly understood, that while the preferred embodiment has been described in terms of molding and drying in one step, and another embodiment has been described in terms of molding and drying in two steps, these are alternative procedures in either embodiment as is apparent to one skilled in the art.

In still a third embodiment, the trash and garbage is shredded in the shredder 10 to approximately the consistency of rock wool. It is then mixed in a mixer 12 with a fireproofing material rather than a binder, such fireproofing material being, for example, a boro-phosphate resin. The boro-phosphate resin slurry can be generally about one part of said resin to about six to nine parts of water, such units being by volume. The resulting slurry is then drained at 15 and dried at 26. When the material is dry it is then packaged for shipping in a conventional way as at 28. This loose material can be used in the same manner that rock wool is used as an insulation either by pouring in exposed areas such as between the joists of an attic floor, or blown between walls in a manner well known in the art.

Figure 2:
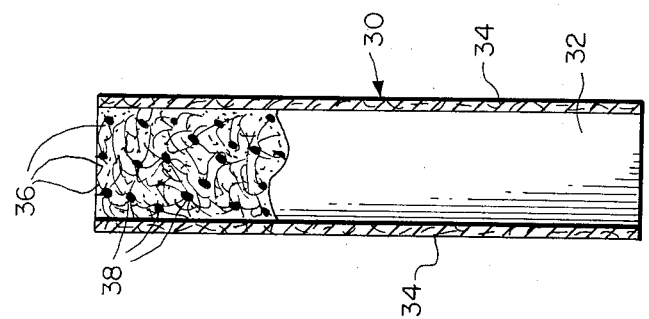
FIG. 2, is a side view of a wall panel constructed according to the present invention, with the surface being partially broken away to show the interior.

Turning to FIG. 2, there is shown a partially broken away side view of a structural wall board generally designated by the numeral 30. This wall board, as with other conventional wall boards comprises a sandwich of the structural material 32 between heavy paper or cardboard 34. The structural material 32 comprises the particles of comminuted refuse 36 in a close relationship with the interstices filled with particles of the binder 38. In this manner, the wall board possesses structural integrity as well as certain insulation properties. While the present invention has been described in terms of a mixture of shredded or ground refuse with a binder, it should be clearly understood that certain other additives which are well known in the art may also be used. For instance, certain fireproofing compounds could be added to the slurry as well as coloring materials and the like.

Thus, it is clear that the objects set forth at the outset of this specification have been successfully achieved. While the instant invention, has been described by reference to certain preferred embodiments, it should be clearly understood that the invention is not limited thereto but is to be construed only by reference to the following claims.

What is claimed is:

1. A method of waste disposal without polluting the environment which comprises the steps of:
    a. comminuting trash and garbage;
    b. mixing the resulting comminuted refuse with an aqueous slurry of a binder selected from the group consisting of aluminum sulfate, sodium silicate, magnesium oxide, and a mixture of starch and enzymes;
    c. draining excess liquid from the resulting mixture of said comminuted refuse and said binder;
    d. molding said mixture into the form of a structural construction unit;
    e. when said binder is a mixture of starch and enzymes, sifting the surfaces of said structural unit with cement; and
    f. drying said mixture.

2. A method according to claim 1, further including a fireproofing agent.

3. A method according to claim 2, wherein said fireproofing agent is a boro-phosphate resin.

4. A structural construction material comprising a compressed panel of a multiplicity of particles of compressed refuse with the interstices between said particles being filled with a binder.

5. A product according to claim 4, wherein said binder is a member of the group consisting of aluminum sulfate, sodium silicate, magnesium oxide, and a mixture of starch and enzymes.

* * * * *